United States Patent
Ishihara et al.

(10) Patent No.: US 11,675,440 B2
(45) Date of Patent: Jun. 13, 2023

(54) SOLVENT FREE TEXTILE COATING

(71) Applicant: Microsoft Technology Licensing, LLC, Redmond, WA (US)

(72) Inventors: James Alec Ishihara, Bellevue, WA (US); Kyra Gould, Redmond, WA (US); Woong Seob Shin, Incheon (KR); Sung Min Lee, Incheon (KR)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/028,684

(22) Filed: Sep. 22, 2020

(65) Prior Publication Data
US 2021/0096655 A1    Apr. 1, 2021

Related U.S. Application Data

(60) Provisional application No. 62/907,943, filed on Sep. 30, 2019, provisional application No. 62/908,358, filed on Sep. 30, 2019.

(51) Int. Cl.
*G06F 1/16*      (2006.01)
*B32B 27/36*     (2006.01)
(Continued)

(52) U.S. Cl.
CPC ............ *G06F 3/0202* (2013.01); *B32B 27/36* (2013.01); *B32B 27/365* (2013.01); *C09D 7/65* (2018.01); *C09D 123/06* (2013.01); *C09D 169/00* (2013.01); *C09J 7/243* (2018.01); *C09J 7/255* (2018.01); *C09J 7/35* (2018.01); *C09J 7/38* (2018.01); *D06N 3/0059* (2013.01); *D06N 3/045* (2013.01); *D06N 3/047* (2013.01);
(Continued)

(58) Field of Classification Search
CPC ...... G06F 1/1669; G06F 1/1656; G06F 3/041; G06F 2203/04103; B32B 27/36; B32B 27/365; B32B 27/32; B32B 27/285; B32B 27/283; B32B 2367/00; B32B 2369/00; B32B 2383/00; B32B 2391/00; B32B 2260/021; B32B 2260/00; C09J 2301/302; C09J 7/38; C09J 7/35; C09D 5/1618; C09D 169/00; C09D 169/005; C09D 191/00; C09D 191/06; C09D 191/08; C09D 175/00; C09D 175/04; C09D 175/06; C09D 17/00
See application file for complete search history.

(56) References Cited

U.S. PATENT DOCUMENTS 5,406,307 A    4/1995  Hirayama et al.
8,688,037 B2   4/2014  Chatterjee et al.
(Continued)

FOREIGN PATENT DOCUMENTS

CN    203233195 U    10/2013
EP    1696073 A1 *   8/2006   ............ B32B 27/12
(Continued)

OTHER PUBLICATIONS

"Non Final Office Action Issued in U.S. Appl. No. 16/830,259", dated Jun. 21, 2021, 10 Pages.
(Continued)

*Primary Examiner* — Dismery Mercedes
(74) *Attorney, Agent, or Firm* — Rainier Patents, P.S.

(57) ABSTRACT

The description relates to solvent free films and textiles that receive the solvent free films.

16 Claims, 8 Drawing Sheets

(51) Int. Cl.

| | |
|---|---|
| *C09D 169/00* | (2006.01) |
| *C09D 123/06* | (2006.01) |
| *C09J 7/38* | (2018.01) |
| *C09J 7/35* | (2018.01) |
| *G06F 3/02* | (2006.01) |
| *C09D 7/65* | (2018.01) |
| *C09J 7/25* | (2018.01) |
| *C09J 7/24* | (2018.01) |
| *D06N 3/00* | (2006.01) |
| *D06N 3/12* | (2006.01) |
| *D06N 3/04* | (2006.01) |
| *G06F 3/041* | (2006.01) |

(52) U.S. Cl.
CPC ............ *D06N 3/121* (2013.01); *D06N 3/128* (2013.01); *G06F 1/1656* (2013.01); *G06F 1/1662* (2013.01); *G06F 1/1669* (2013.01); *G06F 3/041* (2013.01); *B32B 2260/02* (2013.01); *B32B 2367/00* (2013.01); *B32B 2369/00* (2013.01); *B32B 2383/00* (2013.01); *B32B 2391/00* (2013.01); *C09J 2203/358* (2020.08); *C09J 2301/302* (2020.08); *C09J 2301/304* (2020.08); *C09J 2423/046* (2013.01); *C09J 2427/006* (2013.01); *C09J 2469/006* (2013.01); *C09J 2483/006* (2013.01); *C09J 2491/006* (2013.01); *G06F 2203/04103* (2013.01)

(56) References Cited

U.S. PATENT DOCUMENTS

| | | | |
|---|---|---|---|
| 8,766,484 B2 | 7/2014 | Baarman et al. | |
| 9,078,338 B2 | 7/2015 | Ohtaka | |
| 9,149,100 B2 | 10/2015 | Marshall et al. | |
| 9,423,826 B2 | 8/2016 | Mccracken et al. | |
| 9,433,111 B2 | 8/2016 | Myung | |
| 9,497,300 B2 | 11/2016 | Wise et al. | |
| 9,507,381 B1 | 11/2016 | Vanderet et al. | |
| 9,614,384 B2 | 4/2017 | Dowd | |
| 9,632,602 B2 * | 4/2017 | Marwah | G06F 1/163 |
| 9,715,254 B2 | 7/2017 | Mori et al. | |
| 9,720,453 B2 * | 8/2017 | Nelson | B32B 7/14 |
| 9,740,238 B2 | 8/2017 | Han | |
| 9,769,293 B2 | 9/2017 | Gu | |
| 9,851,759 B2 | 12/2017 | Tazbaz et al. | |
| 9,883,583 B2 | 1/2018 | Cousins et al. | |
| 9,898,098 B2 | 2/2018 | Immel et al. | |
| 9,946,295 B2 | 4/2018 | Smith et al. | |
| 9,946,312 B2 | 4/2018 | Mccracken et al. | |
| 9,983,632 B2 * | 5/2018 | Kuscher | G06F 1/1616 |
| 10,114,423 B2 | 10/2018 | Sharma et al. | |
| 10,146,270 B2 | 12/2018 | Li et al. | |
| 10,185,058 B2 * | 1/2019 | Snyder | B32B 3/02 |
| 10,381,884 B2 | 8/2019 | Shaw et al. | |
| 10,664,012 B1 | 5/2020 | Zimmerman et al. | |
| 10,732,679 B2 | 8/2020 | Wu et al. | |
| D905,694 S | 12/2020 | Goh et al. | |
| 11,239,710 B2 | 2/2022 | Gaule et al. | |
| 2006/0142455 A1 * | 6/2006 | Agarwal | C08L 101/00 524/451 |
| 2006/0165463 A1 | 7/2006 | Katz et al. | |
| 2006/0292321 A1 | 12/2006 | Chervin et al. | |
| 2008/0246181 A1 * | 10/2008 | Zhu | C08L 55/02 524/495 |
| 2011/0060106 A1 * | 3/2011 | de Kraker | C08L 69/00 525/461 |
| 2011/0224307 A1 * | 9/2011 | Fenyvesi | A01N 31/02 514/723 |
| 2012/0178322 A1 * | 7/2012 | Mehta | E04D 5/02 428/221 |
| 2014/0071654 A1 * | 3/2014 | Chien | H01H 13/704 362/23.03 |
| 2014/0072312 A1 | 3/2014 | Aldana et al. | |
| 2014/0151370 A1 * | 6/2014 | Chang | B65D 1/0215 220/62.15 |
| 2015/0270046 A1 | 9/2015 | Golko et al. | |
| 2015/0353732 A1 * | 12/2015 | Wang | C08L 67/02 524/588 |
| 2016/0034054 A1 | 2/2016 | Utykanski et al. | |
| 2016/0187933 A1 | 6/2016 | Nelson et al. | |
| 2016/0200937 A1 * | 7/2016 | Hu | C08G 18/61 523/122 |
| 2017/0063419 A1 | 3/2017 | Griffin et al. | |
| 2017/0086017 A1 | 3/2017 | Mercando et al. | |
| 2017/0222456 A1 | 8/2017 | Perez et al. | |
| 2018/0218859 A1 * | 8/2018 | Ligtenberg | H01H 13/86 |
| 2018/0284905 A1 | 10/2018 | Hewett et al. | |
| 2018/0287414 A1 | 10/2018 | Teich et al. | |
| 2019/0041919 A1 | 2/2019 | Makinen et al. | |
| 2019/0105932 A1 * | 4/2019 | Nguyen | B32B 5/024 |
| 2019/0128648 A1 * | 5/2019 | Bhatnagar | B32B 27/308 |
| 2020/0089276 A1 | 3/2020 | Zhu et al. | |
| 2021/0099025 A1 | 4/2021 | Gaule et al. | |
| 2022/0158506 A1 | 5/2022 | Gaule et al. | |

FOREIGN PATENT DOCUMENTS

| | | |
|---|---|---|
| EP | 1696073 A1 | 8/2006 |
| JP | 2019040560 A | 3/2019 |
| WO | 2015059924 A1 | 4/2015 |

OTHER PUBLICATIONS

"International Search Report and Written Opinion Issued in PCT Application No. PCT/US2020/052984", dated Dec. 22, 2020, 15 Pages.

"International Search Report and Written Opinion issued in PCT Application No. PCT/US20/038577", dated Oct. 2, 2020, 13 Pages.

"Non Final Office Action Issued in U.S. Appl. No. 17/589,433", dated Sep. 27, 2022, 8 Pages.

* cited by examiner

SOLVENT FREE FILM COMPOSITIONS 700

| | DOE ID | | 0 | 1 | 2 | 3 | 4 | 5 | 6 | 7 | 8 | 9 | 10 | 11 | 12 |
|---|---|---|---|---|---|---|---|---|---|---|---|---|---|---|---|
| | | | CK6-J | CK-A-J | CK-B-J | CK-C-J | CK-D-J | CK-E-J | CK-F-J | CK-G-J | CK-H-J | CK-I-J | CK-J-J | CK-K-J(H) | CK-L-J(H) |
| SKIN | CPC | COVESTRO PC | 10 | 100 | 90 | | | | | 90 | 70 | 50 | 30 | 30 | 30 |
| | CPE | COVESTRO PC+PE | 90 | | 10 | | | 10 | 10 | | | | 70 | 70 | 70 |
| | DPC A | PC | | | | | | 90 | | | | | | | |
| | DPC B | PC | | | | | 100 | | 90 | | | | | | |
| | ST001 | STAHL AS | | | | | | | | 10 | 30 | 50 | | | |
| | | SILIOXANE | 3 | 3 | 3 | 3 | 3 | 3 | 3 | 3 | 3 | 3 | 3 | 3 | |
| | | WAX | 2 | 2 | 2 | 2 | 2 | 2 | 2 | 2 | 2 | 2 | 2 | 2 | 2 |
| | FP FOR WR | WATER REPELLENCY | | | | | | | | | | | 6 | 6 | 6 |
| | | TINT | X | X | X | X | X | X | X | X | X | X | X | X | O |
| HOTMELT | | | J | J | J | J | J | J | J | J | J | J | J | J(H) | J(H) |
| SCRATCH TEST (RATING) | | | 4-5 | 4 | 4 | 4 | 4 | 4 | 6 | 3 | 3 | 2 | 2 | 2 | 2 |

Rating Standard:
Rank 1: No scratch nor whitening
Rank 2: No scratch on the PU skin, but has little whitening
Rank 3: No scratch on the PU skin, but whitening line is visible
Rank 4: Some scratch is found on the PU skin, whitening line is apparent
Rank 5: PU Skin is broken and it makes very clear scratch line

FIG. 7

SOLVENT FREE TEXTILE COATING

PRIORITY

This utility patent application claims priority from U.S. Provisional Patent Application 62/908,358, filed on Sep. 30, 2019 and U.S. Provisional Patent Application 62/907,943, filed on Sep. 30, 2019, which are hereby incorporated by reference in their entirety.

BACKGROUND

Film coatings are applied to textiles to improve one or more characteristics of the textile. For instance, a film coating may be applied to a textile to improve its spill resistance. However, these film coatings contain carcinogenic solvents, such as Dimethylformamide (DMF). These solvents can be deleterious to the environment, dangerous for the assembly workers and/or the end user, and/or cause color bleeding of the textile. The present concepts address these and other issues.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DETAILED DESCRIPTION

The present concepts relate to solvent free coatings that can be formed into solvent free films. The solvent free films can be free of dangerous organic solvents, such as DMF. DMF is a cancer-causing agent, that is used in the manufacturing of solvent based textiles and textile coatings. The solvent free films can be employed for various uses. Notably, the solvent free films can be applied to textiles to achieve desired characteristics, such as texture, cleanability, and/or water resistance, among others.

Figure 1A:
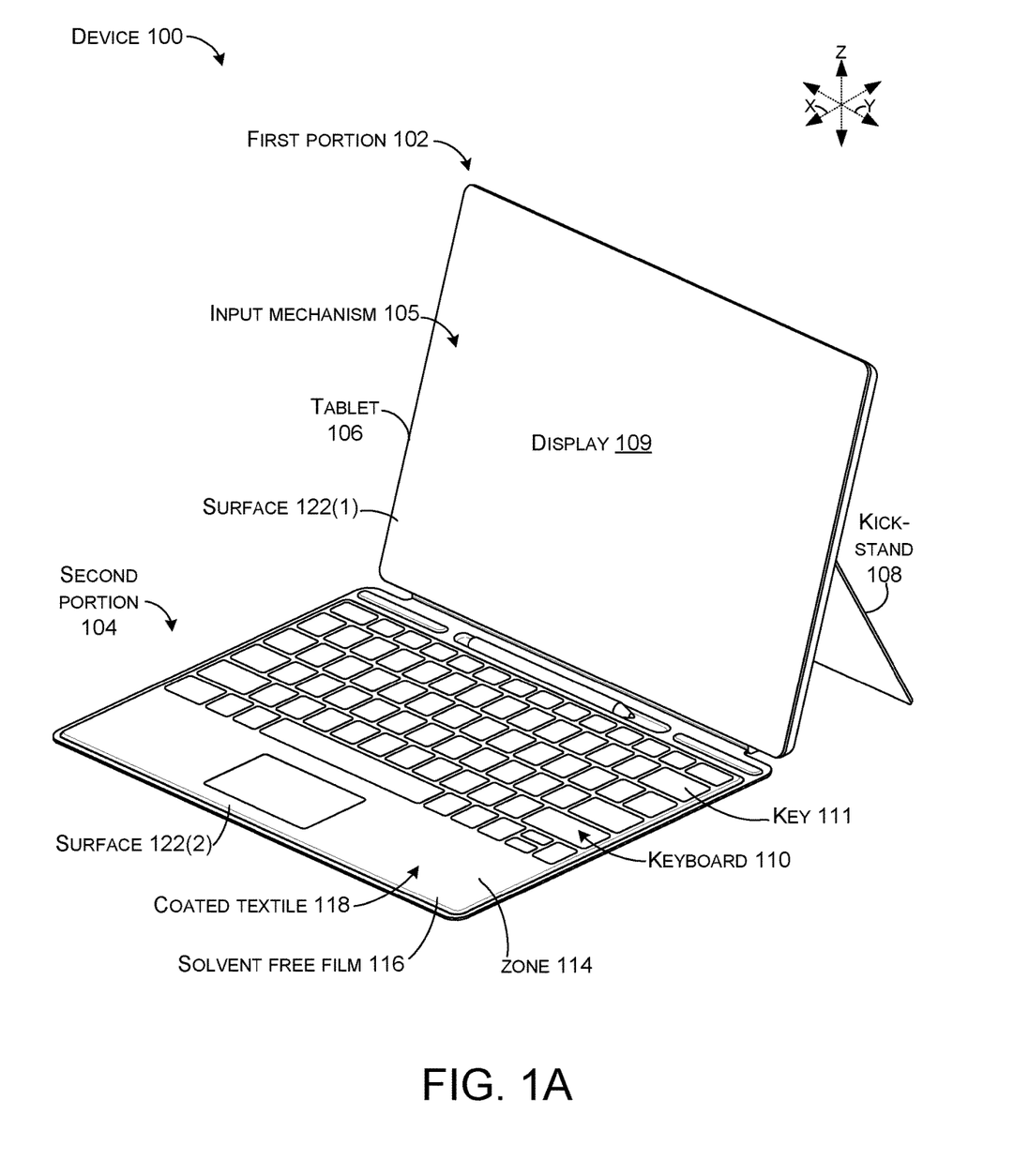
FIG. 1A shows a perspective view of an example device that includes the present solvent free textile coating concepts in accordance with some implementations.
Figure 1B:
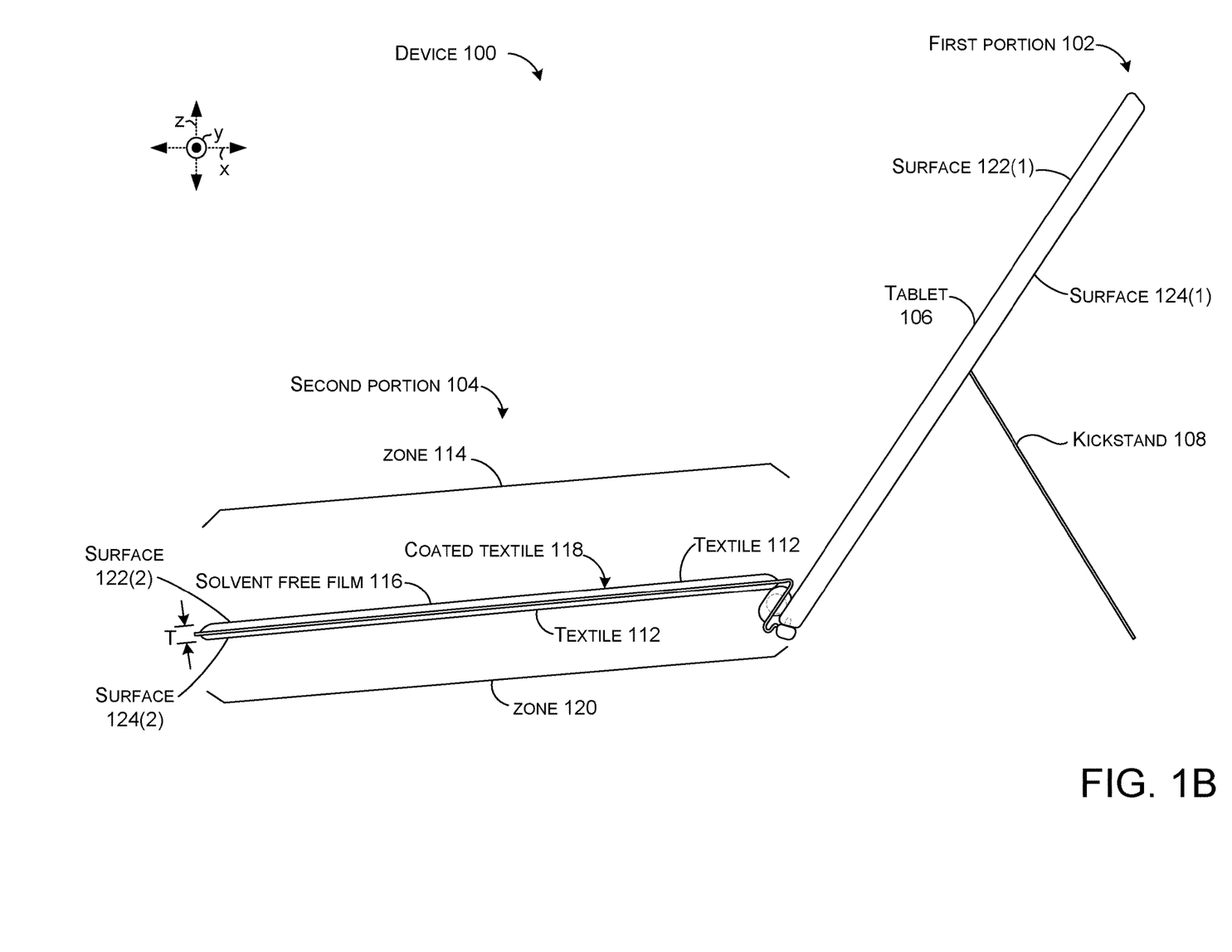
FIG. 1B shows an elevational view of an example device that includes the present solvent free textile coating concepts in accordance with some implementations.

FIGS. 1A and 1B collectively show an example device 100 that can employ the present solvent free film concepts. In this case, the device 100 includes a first portion 102 and a second portion 104 and may include input mechanisms 105. In this example, the first portion 102 is manifest as tablet 106 that includes a deployable kickstand 108 and an input mechanism 105 in the form of a touch-sensitive display 109. The second portion 104 is manifest as a detachable keyboard 110 with input mechanisms in the form of keys 111. In some configurations the second portion 104 can be covered with a textile 112. In this particular instance, a region or zone 114 (e.g., upwardly facing major surface) of the textile 112 is covered with a solvent free film 116 to make a coated textile 118. (Note that the solvent free film tends to be so thin that it is not readily visible in an image of the scale of FIGS. 1A and 1B). In this case, zone 114 can include portions of the keyboard 110 that function as a palm or arm rest for a user of the device. Other use case scenarios are contemplated.

In this example, another region or zone 120 (e.g., downwardly facing major surface) is not covered (e.g., is uncoated). In other cases, zone 120 may be covered with the same solvent free film 116 or a different solvent free film as zone 114. Note that other portions of the device 100 (or other devices) can be covered with textile 112 and solvent free film 116. For instance, the kickstand 108 can be covered with textile that is covered with the same or a different solvent free film.

From another perspective, the device 100 or portions thereof can include spaced apart surfaces 122 and 124. The surfaces 122 and 124 can define a constrained thickness T of the device. The input mechanism 105, such as touch-sensitive display 109 or keys 111 can be positioned relative to the first and/or second surfaces 122 and 124. The coated textile 118 can cover and thereby define at least zone 114 and/or 120 of one or both surfaces 122 and 124. The coated textile 118 can define the look and feel of the device while consuming very little of the constrained thickness T of the device. Example dimensions of the coated textile 118 are described below relative to FIG. 4.

The solvent free film 116 can provide various desired properties to the textile 112. For instance, the solvent free film 116 can enhance and/or provide texture, waterproofing, stain resistance, tear resistance, cleanability, etc. In the illustrated configuration, the solvent free film 116 on the upper surface (e.g., first surface 122(2)) of the keyboard (e.g., around the keys) can provide a soft texture, enhanced spill resistance, enhanced stain resistance, enhanced cleanability and/or enhanced tear resistance to the upper surface. For instance, the user may touch the upper surface as they type and thus resistance to various substances, such as lotions and/or sunscreens that may be on the user's hand(s) can be a priority for the upper surface. Similarly, the user may eat or drink while they use the keyboard and so the upper surface may be subject to various spills, such as soft drinks, coffee, condiments, such as mustard and ketchup, etc. Thus, stain and water resistance can be important properties for the upper surface of the keyboard.

The textile 112 on the lower surface (e.g., second surface 124(2)) may not be exposed to the same user environment and can be left uncoated and can provide a coarser texture or can be coated with a different solvent free film that has different properties. This coarser texture can provide friction between the lower surface and whatever object the keyboard is placed upon to reduce slipping. In this case, the region/zone 120 (e.g., lower surface) entails textile with no film. Alternatively, the lower surface could entail a textile with a different solvent free film (e.g., a coated textile), such as one selected for durability and scratch resistance, among other properties.

Thus, individual zones of the fabric/textile can be treated to have different textures. For instance, a solvent free polyurethane based coating can be applied to a sheet or layer of the material covering the keyboard to provide an easy to clean, stain resistant surface. The underside of the keyboard may be covered with another layer that has a more textured feel that grips a work surface, such as a table top. Alternatively, the zone of fabric on the underside of the keyboard may be treated and/or coated differently to have a more textured feel (e.g., a greater coefficient of friction).

The present concepts can provide the desired properties of individual regions or zones in dimensionally constrained device scenarios. For instance, second portion 104 has thickness T that is dimensionally constrained. In this scenario, less than one millimeter may be allotted to the coated textile 118. Yet, the coated textile can provide desired properties including a soft flexible feel even though the underlying components may be relatively rigid and the coated textile is extremely thin. Other properties that can be achieved with this thin coated textile are described above and below and can include, stain resistance, water resistance, and/or tear resistance, among others.

Figure 2:
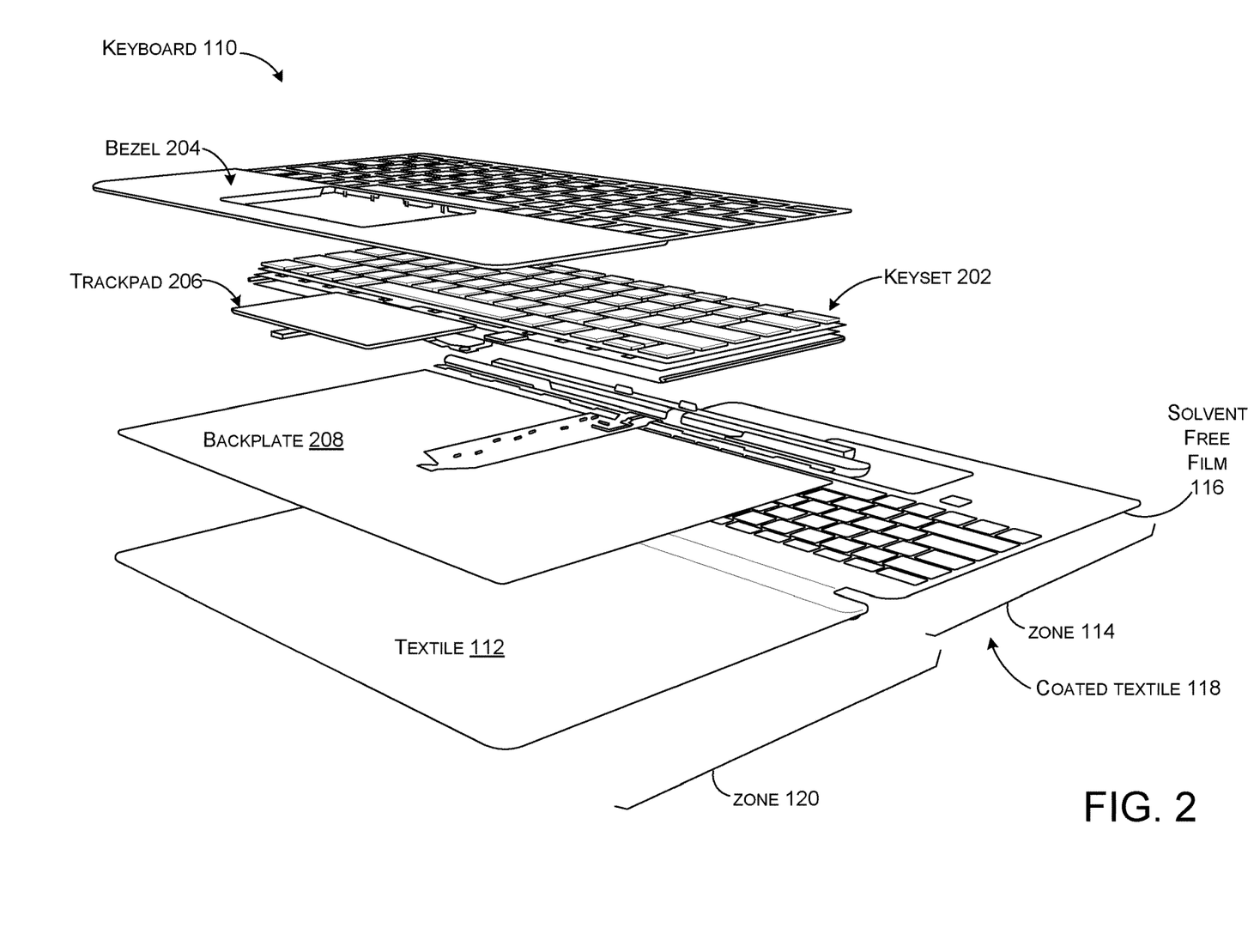
FIG. 2 shows an exploded perspective view of an example device that includes the present solvent free textile coating concepts in accordance with some implementations.

FIG. 2 shows an exploded view of example keyboard 110. In this case, the textile 112 can include zone 114 that includes solvent free film 116 and zone 120 that does not include the solvent free film. The textile 112 can be wrapped around a keyset 202, a bezel 204, a trackpad 206, and a backplate 208. The keyset 202 and trackpad 206 can provide an input mechanism that is bounded by the bezel 204, while the backplate 208 can provide rigidity and planarity to maintain the first and second major surfaces described above relative to FIGS. 1A and 1B. Thus, when assembled, the coated textile 118 of zone 114 is facing upwardly (e.g., contacted by the user's hands) and the uncoated textile of zone 120 is facing downwardly.

The present solvent free coating concepts are introduced above relative to an example device in the form of a tablet type device 100. This device represents a class of dimensionally constrained devices, such as notebook computers, smart phones, etc. where thickness tends to be minimized at the request of consumers and every micron (um) of thickness is evaluated and scrutinized. The present concepts can satisfy the thickness constraints while simultaneously satisfying other properties, such as texture, water resistance, and/or stain resistance that are discussed in more detail above and below, while also eliminating dangerous solvents (e.g., solvent residues) that came into contact with the user with previous technologies. These concepts can be applied to other types of devices, such as vehicles, such as on seats, dashes, interior door panels, etc., apparel, such as clothing and shoes, appliances, furniture, etc.

Figure 3:
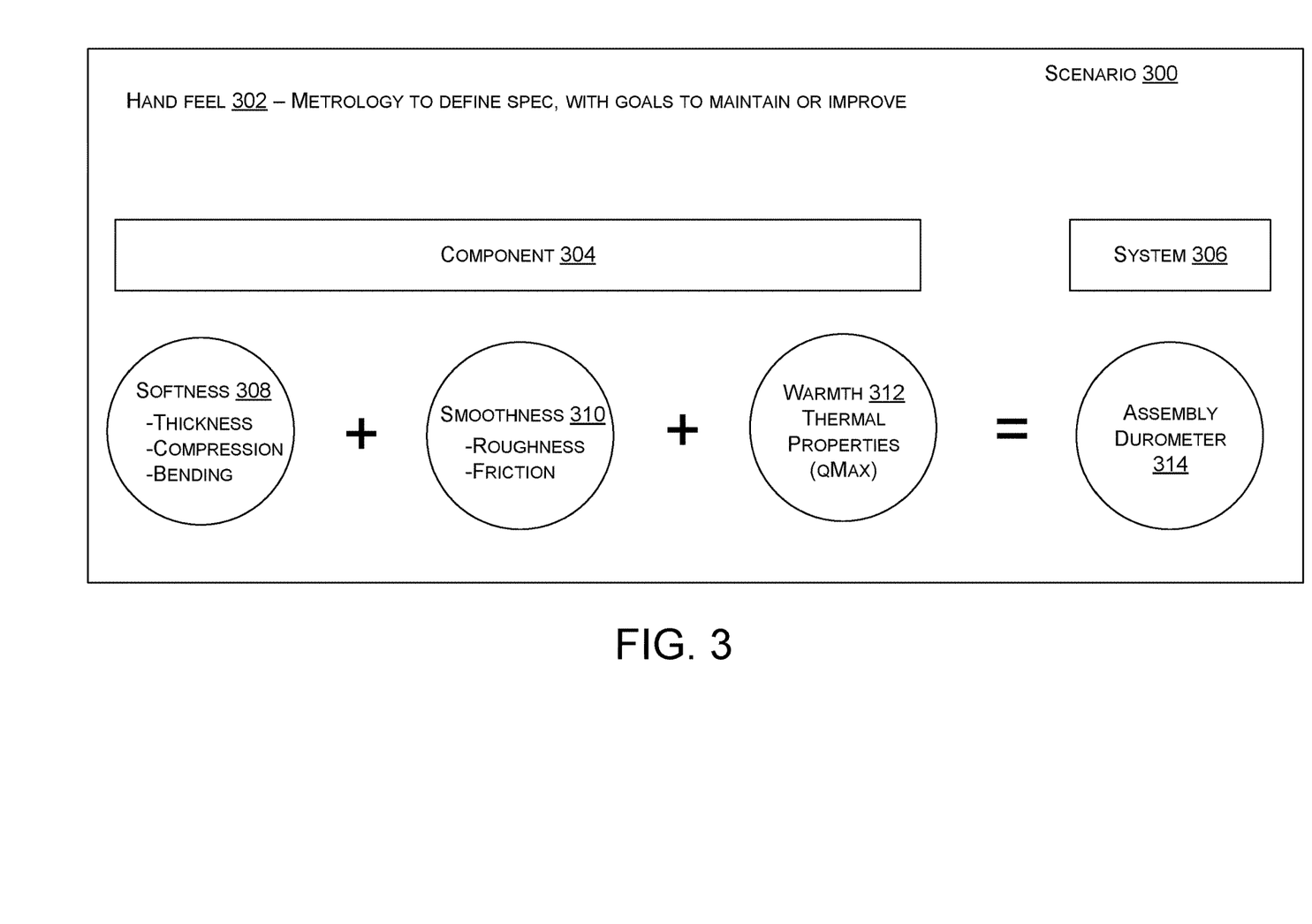
FIG. 3 shows an example scenario relating to the present solvent free textile coating concepts in accordance with some implementations.

FIG. 3 shows a scenario 300 where desired properties, such as hand feel 302, of coated textile 118 can be analyzed. In this case, the role of a component 304, such as a keyboard, can be analyzed relative to an overall device system 306. Hand feel 302 can be a property that contributes to the overall user experience and satisfaction with the component 304 and system 306. Hand feel can be quantified with metrology to various defined specifications. The present concepts can maintain or improve the defined specifications over previous solutions, while eliminating dangerous solvents.

The defined specifications can include softness 308, smoothness 310, and/or warmth 312, among others. These specifications can contribute to hardness of the coated textile as measured by a durometer 314. In the example introduced above relative to FIGS. 1A and 1B, the user may prefer a soft, smooth, warm feel for his/her hands on the top of the keyboard, but may want a tougher, harder feel on the bottom of the keyboard. Those properties can be quantified and achieved for specific zones by selectively formulating and applying solvent free films to the textile.

The solvent free films can also offer improved color related properties. As mentioned above, traditional solutions involved the use of solvents to create films for use on textiles. Typical solvents, such as DMF attack dyed textiles, causing the dyed textile to color bleed over time. Removing this solvent enables laminating a solvent free coating which can accentuate color from a dyed or printed textile rather than degrading the color properties of the textile. The solvent free coating can enable the user to easily clean the material (i.e. screen cleaner wipe, damp cleaning cloth, etc.). Since the color is inherent in the composite laminate, edge dyeing is not needed. Edge dyeing is expensive and typically involves toxic chemicals.

Figure 4:
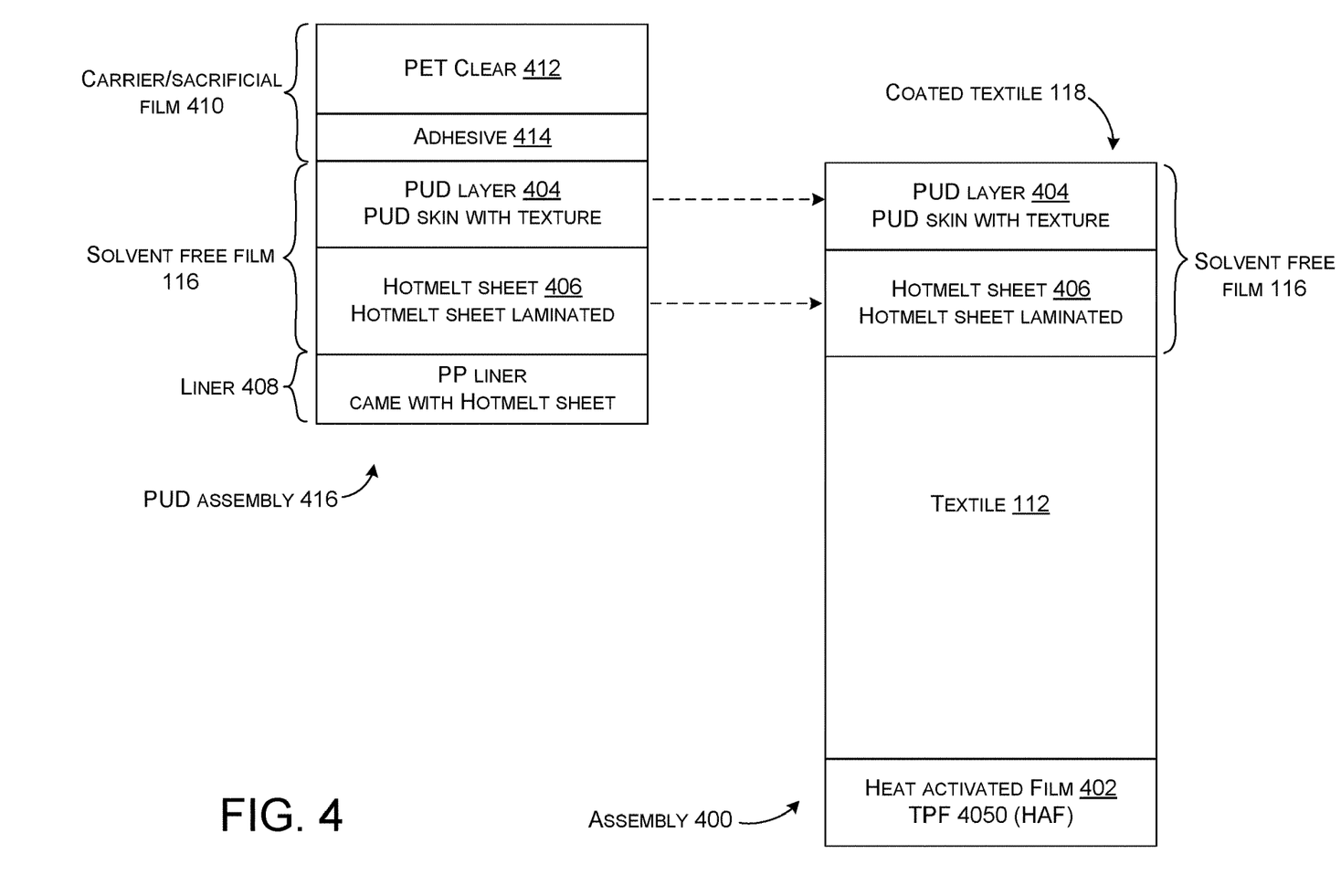
FIG. 4 shows an example solvent free coated textile in accordance with some implementations.

FIG. 4 shows an example coated textile 118 on the right side of the drawing page. In this implementation, the coated textile 118 can include solvent free film 116 secured to textile 112, such as Alcantara. The coated textile 118 can be part of an assembly 400 that may also include an adhesive, such as a heat activated film (HAF) 402.

The left side of the drawing page of FIG. 4 shows an example of how solvent free film 116 can be prepared. In this case, the solvent free film 116 includes a Polyurethane Dispersion (e.g., polyurethane dispersed in water) (PUD) layer 404 and a hotmelt layer or sheet 406. The solvent free film 116 can be positioned on a polypropylene (PP) liner 408. A carrier or sacrificial film 410 can be positioned on the opposite side of the solvent free film 116 from the liner 408. In this case, the carrier film 410 can include a Polyethylene terephthalate (PET) clear layer 412 and an adhesive layer or sheet 414, such as a pressure sensitive adhesive (PSA).

In this particular implementation, the PUD layer 404 can be formed on the carrier film 410. Similarly, the hotmelt sheet 406 can be formed on the liner 408. The PUD layer 404 and the hotmelt sheet 406 can be positioned against one another to form a PUD assembly or laminate 416. This aspect is described in more detail below relative to FIG. 5.

As mentioned above, the coated textile 118 can be very thin, such as less than one millimeter. In the illustrated example, the PET clear layer 412 can have a thickness of 10-200 microns (um), the adhesive layer 414 can have a thickness of 5-75 um, the PUD layer 404 can have a thickness of 10-100 um, the hotmelt sheet 406 can have a thickness of 40-200 um, the textile 112 can have a thickness of 100-1000 um, and the heat activated film 402 can have a thickness of 10-120 um. Other thicknesses are contemplated, both thicker and thinner. Further, other mechanisms for associating the PUD layer 404 with the textile 112 are contemplated. For instance, the PUD layer could be sprayed over the textile. The described concepts can allow desired properties to be achieved on a thinner coated textile 118 than can be achieved with other technologies.

Figure 5:
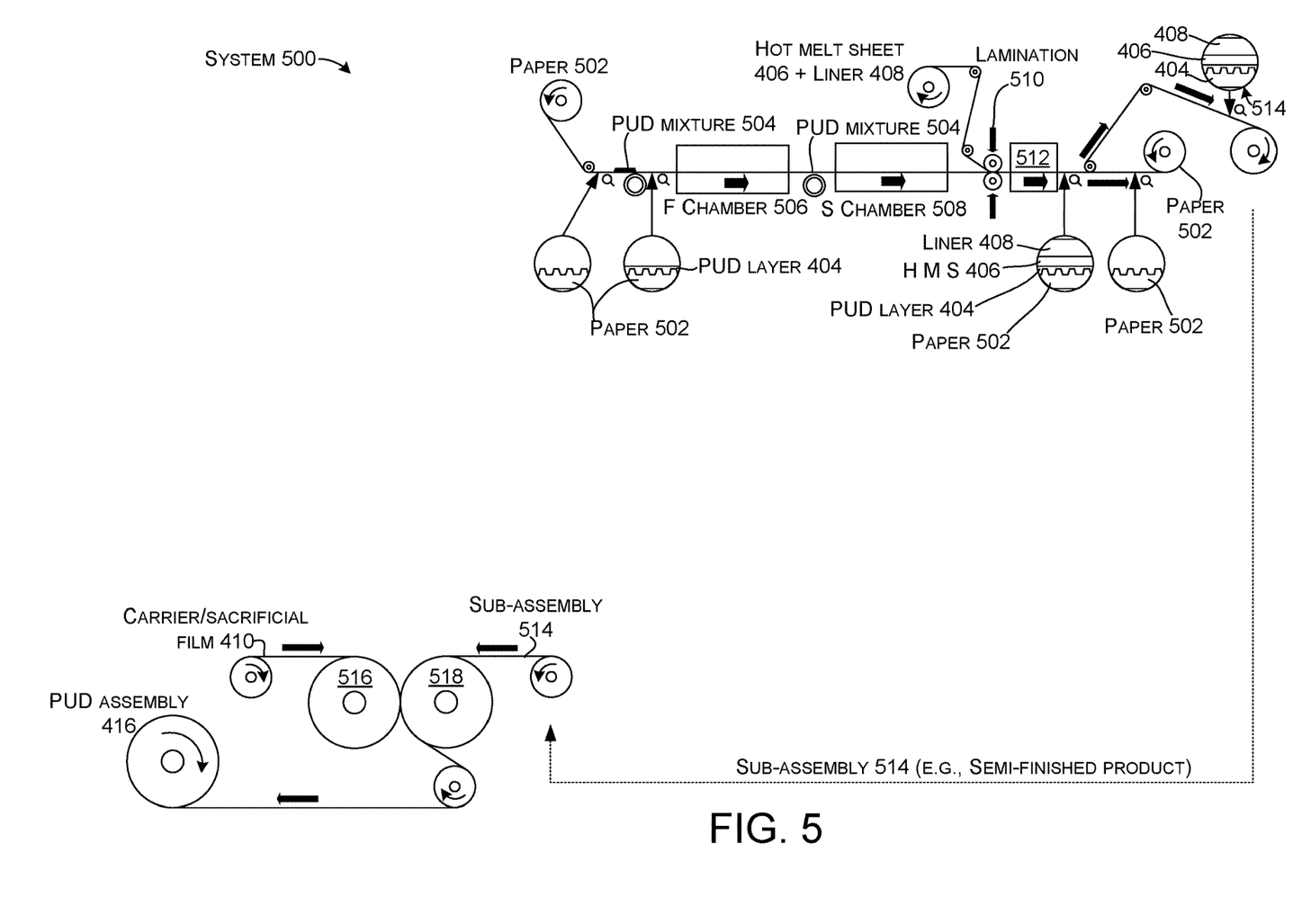
FIG. 5 shows an example system that can produce solvent free films for producing solvent free coated textiles in accordance with some implementations.

FIG. 5 shows an example system 500 for making PUD assembly 416. In this case, system 500 includes a roll of paper 502 (e.g., release paper or skin). A PUD mixture 504 can be prepared and/or maintained and a PUD layer 404 is formed on the paper 502. Example PUD formulations are described below relative to FIG. 7. The PUD coated paper can be processed in a first chamber 506 and the coating and processing may be repeated relative to a second chamber 508. Hot melt sheet 406 and liner 408 can be laminated to the PUD layer 404 on the paper 502 at 510 and processed in a third chamber 512. The paper 502 can be separated to produce a sub-assembly 514 that can include the PUD layer 404, the hotmelt sheet 406, and the liner 408. This sub-assembly 514 can be formed onto carrier sacrificial film 410 by press rollers 516 and 518 to produce the PUD assembly 416 (e.g., finished product). As discussed above relative to FIG. 4, the PUD assembly 416's solvent free film 116 can be applied to various textiles 112 to create coated textiles 118.

In some implementations, solvent free film 116 can be applied to all zones of the textiles 112. In other implementations, the solvent free film 116 can be shaped, such as by laser cutting and discreetly placed in specific zones (e.g. keyboard side for easy cleaning, logo, laptop feet, etc.). In such cases, pressure sensitive adhesive can provide ready adhesion between the textile and the solvent free film. Thus, application can be greatly simplified over previous technologies where the solvent based films had to be glued to the textile. In the present implementations, the carrier can simply be removed and the solvent free film (having a desired shape) can be placed at a desired location (e.g., zone) on the textile. The combined solvent free film and textile can be compressed together to activate the pressure sensitive adhesive to secure them together. Other implementations can apply the solvent free PUD film to a texturized PET film, to imprint a texture and remove the Si PSA component to save cost and enable finer textures, produce less waste and/or offer better recyclability of the sacrificial materials.

The manufacturing of the described solvent free coatings can utilize 95% less water and 50% less energy than traditional solvent based formulations during the manufacturing cycle.

The present implementations remove DMF solvent from the manufacturing process to comply with REACH, RoHS, CA prop 85, skin and hypo-allergenic sensitivity testing. Stated another way, at least some of the present implementations can be achieved without intentionally adding organic solvents, such as DMF. Further, the solvent free coating can be essentially free of such solvents (e.g., less than 1 part per million). Thus, the present implementations can enable coating dyed or printed textiles, without any chemical interactions with DMF solvent. Thus, the solvent is removed from the manufacturing process and no solvent residues occur in the final product that could harm the user when they touch the coated textile. The present implementations can supply responsible chemistry for better environmental consequences at manufacturing sites.

The present implementations offer a solvent free material that is, as good, or better (mechanical, chemical and UV resistance) than traditional solvent based textile coatings. The present solvent free coatings can be precisely cut and placed in specific zones needed to add functionality like easy to clean, decoration, and/or grip. Further, the present implementations can provide enhanced user experiences beyond the environmental and health benefits. For instance, the present implementations offer enhanced aesthetics that create an ownable, iconic, and magical aesthetic look and feel.

The present implementations can be optimized to various form factors for functional components and enhanced user experience, including more robust design quality and enabling more material choices.

Figure 6:
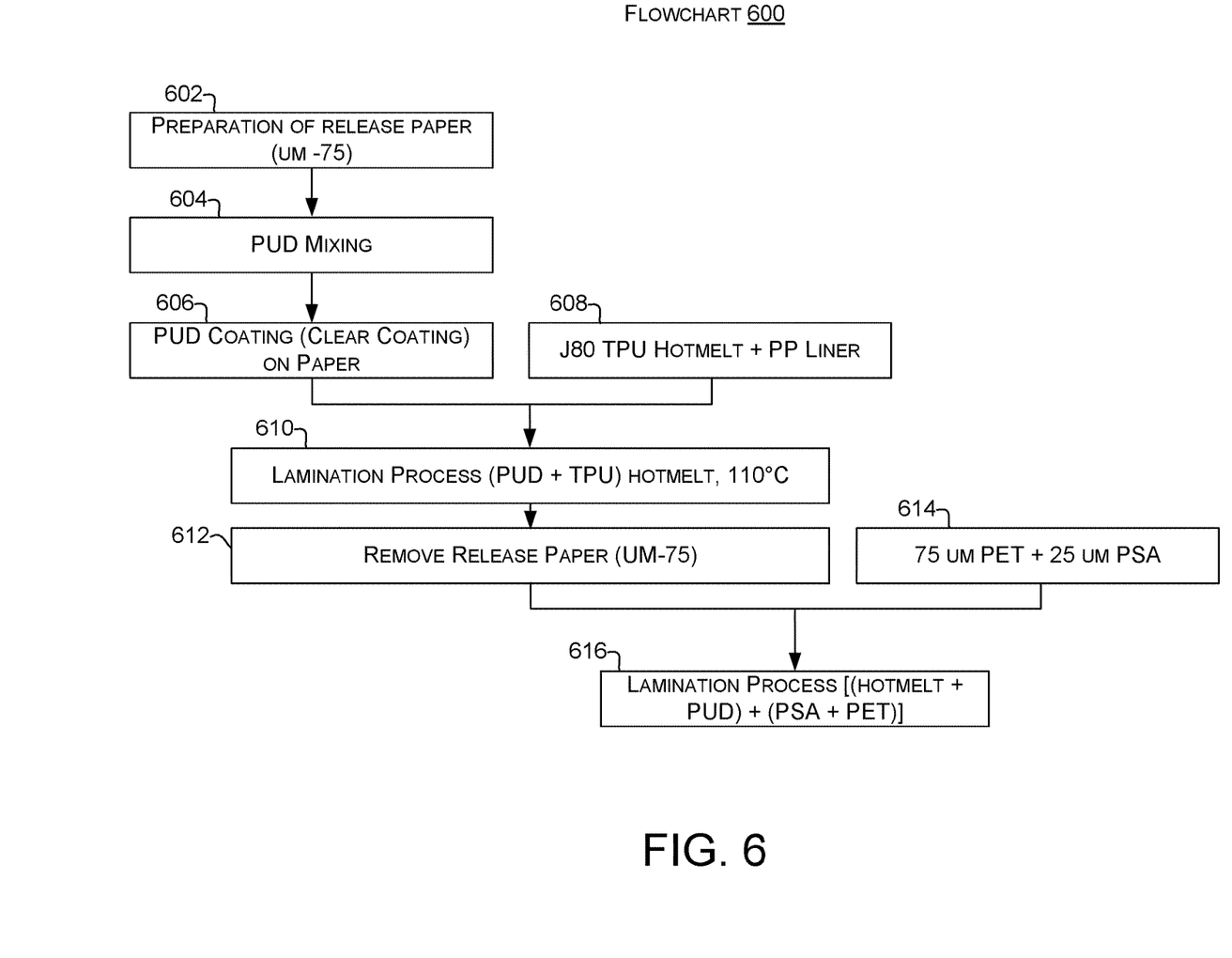
FIG. 6 shows an example method that can produce solvent free films for producing solvent free coated textiles in accordance with some implementations.

FIG. 6 shows a flowchart 600 that can be implemented on various systems, such as system 500, for example. The flowchart 600 can include preparing release paper or other substrate at 602 and PUD mixing at 604. Example PUD mixes are described below relative to FIG. 7. For instance, the PUD mixes can include PE or PET based polyurethane. The PUD mix can be coated onto the paper at 606 to create PUD coated paper. A hot melt sheet (e.g., J80 TPU hotmelt) and a liner (e.g., polypropylene liner) can be supplied at 608 and can be laminated to the PUD coated paper at 610. The release paper can be removed at 612 leaving the PUD layer, hotmelt sheet and PP liner sub-assembly. Carrier film (e.g., PET and PSA) can be supplied at 614 and laminated to the remaining PUD layer, hotmelt sheet and PP liner sub-assembly at 616.

Figure 7:
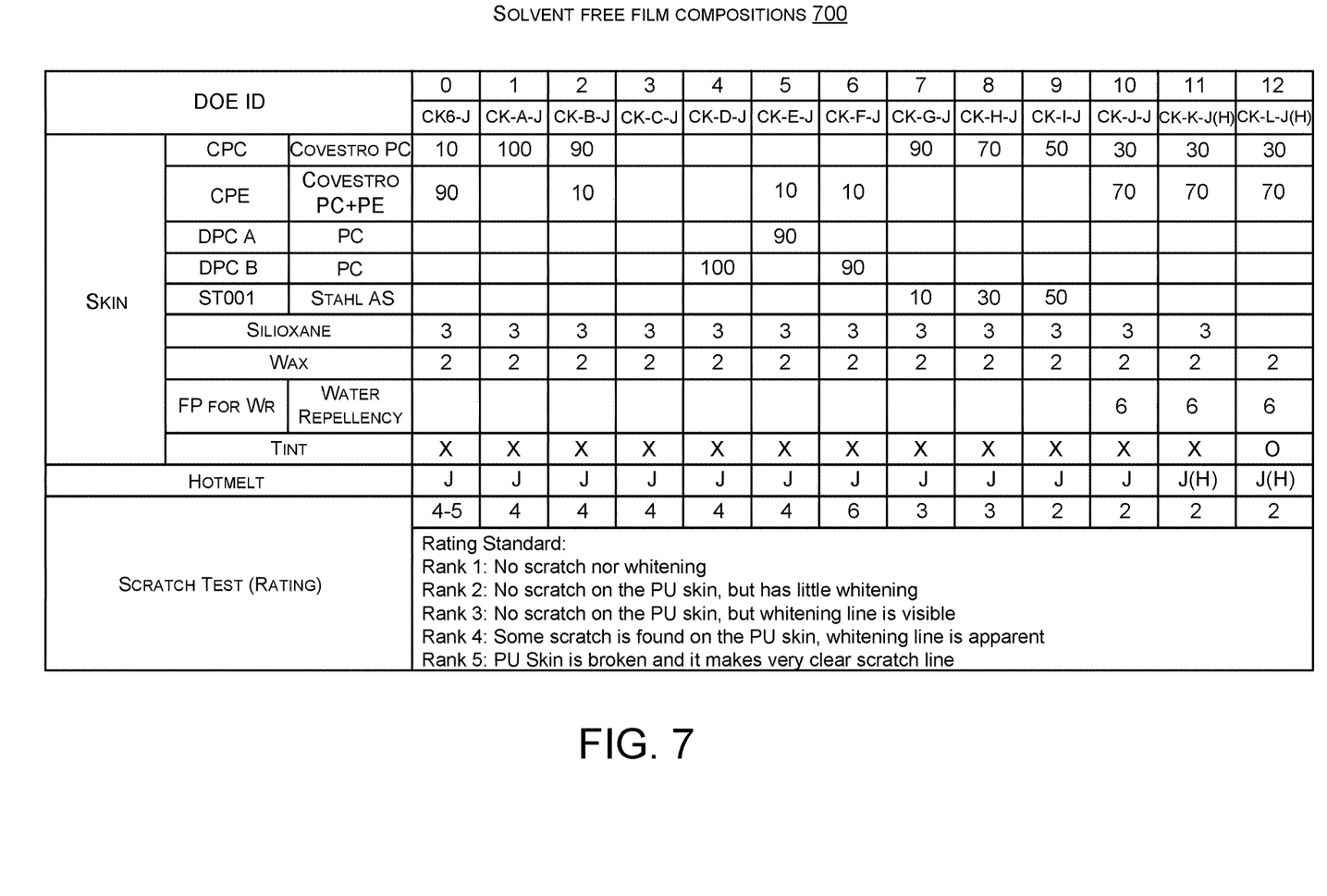
FIG. 7 shows a table of example solvent free film compositions in accordance with some implementations.

FIG. 7 shows a table of potential solvent free film compositions 700. The present solvent free coatings/films can include a polyurethane dispersed (PUD) in water to meet application goals of an invisible clear coating, silky hand feel, high mechanical, and/or chemical and UV resistance, among others.

Historically it was recognized that no single material can provide all of these properties. Instead, multiple components would need to be combined to achieve the various properties. Traditionally, combinations of materials where dispersed with hazardous solvents, such as DMF. The hydrophobic nature of many of the candidate components indicates that water could not be utilized as a dispersion agent for the combined components. However, the present coating formulations successfully employ water as an effective dispersant that provides a generally uniform blend of the components in the resultant solvent free film. The present coating formulations can provide a range of different grades of soft and hard PUD, and various additives to improve hand feel, mechanical, chemical, and/or UV resistance, among others without any dangerous solvent residue in the finished coated product.

The present solvent free films can be applied to various textiles. In one case, the textile can be manifest as an Alcantara Brand textile. Examples of other textiles can include woven textiles and/or non-woven textiles, such as ultra microfiber, knits, leather, and/or suede, among others. The present solvent free film implementations can be applied to the textile to change the texture and/or improve cleanability, spill resistance, and/or hand feel, among others.

Example solvent free coating compositions can include polycarbonate (PC), polyethylene (PE), siloxane, wax, and/or a fluoropolymer (FP). Various waxes, such as Aquacer 531 can be utilized. Various Fluoropolymers, such as Perfluoroalkyl ethyl acrylate copolymer, can be utilized. This combination of components can provide toughness, scratch/tear resistance, hand feel, resistance to staining, wear resistance, water resistance, and/or color consistency and color fastness. The combination can also be clear so that the color of the textile is visible through the solvent free coating.

In some implementations, the dry weight percentages for some implementations are:
  Polycarbonate (PC) 40-52%,
  Polyethylene (PE) 37-49%,
  Siloxane 0-6%,
  Wax 0-6%,
  Fluoropolymer (FP) 0-9%.
In other implementations, the dry weight percentages for some implementations are:
  Polycarbonate (PC) 30-50%,
  Polyethylene (PE) 30-50%,
  Siloxane 0-10%, Wax 0-10%,
Fluoropolymer (FP) 0-10%.

In still other implementations, the dry weight percentages for some implementations are:
Polycarbonate (PC) 30-49%,
Polyethylene (PE) 40-60%,
Siloxane 1-10%,
Wax 1-10%,
Fluoropolymer (FP) 1-10%.

Generally speaking, polycarbonate can contribute to overall strength (e.g., toughness) but is easily scratched. Polyethylene has relatively lower strength, but has high impact resistance, low friction and a waxy soft feel (e.g. texture). Siloxane can contribute to initial scratch resistance so an object slides across the surface of the coated textile rather than gouging. The wax can contribute to texture, stain resistance, and feel (e.g. texture). The Fluoropolymer can contribute to stain resistance and water resistance. It would be expected that these components would be opaque or cloudy and interfere with the appearance of the underlying textile. Instead, the combination of components can be relatively transparent so that the underlying color of the textile is visible. In some cases, dyes could be added to the formulation to create a colored solvent free film. Since no hazardous solvent is utilized for dispersal, no solvent remains in the finished film to degrade the dyes of the film and/or the textile or the resultant color qualities. Other components can also be added to the composition. For instance, antimicrobial compounds, such as Silver, Copper, Zinc, essential oils (e.g. oregonal) and/or Graphene, can be added to the composition, among others.

A first implementation comprises:
Polycarbonate 44%,
Polyethylene 44%,
Siloxane 4%,
Wax 2%, and
Fluoropolymer 6%.

A second implementation comprises:
Polycarbonate 46%,
Polyethylene 46%,
Siloxane 3%,
Wax 2%, and
Fluoropolymer 3%.

A third implementation comprises:
Polycarbonate 45%,
Polyethylene 43%,
Siloxane 4%,
Wax 4%, and
Fluoropolymer 4%, A fourth implementation comprises:
Polycarbonate 46%,
Polyethylene 43%,
Siloxane 3%,
Wax 2%, and
Fluoropolymer 6%.

A fifth implementation comprises:
Polycarbonate 50%,
Polyethylene 40%,
Siloxane 4%,
Wax 2%, and
Fluoropolymer 4%.

A sixth implementation comprises:
Polycarbonate 52%,
Polyethylene 38%,
Siloxane 2%,
Wax 4%, and
Fluoropolymer 2%.

A seventh implementation comprises:
Polycarbonate 49%,
Polyethylene 41%,
Siloxane 2%,
Wax 4%,
Fluoropolymer 2%, and
Silver 0.1%.

Various device examples are described above. Additional examples are described below. One example includes a device comprising first and second spaced apart surfaces that define a constrained thickness of the device and an input mechanism positioned relative to the first and second surfaces, and wherein at least one of the first and second surfaces is defined at least in part by a coated textile that includes a solvent free coating comprising Polycarbonate, Polyethylene, Siloxane, Wax, and Fluoropolymer.

Another example can include any of the above and/or below examples where the solvent free coating is essentially free from organic solvent residue.

Another example can include any of the above and/or below examples where the coated textile is less than 1 millimeter thick, or wherein the solvent free coating is less than 50 microns thick.

Another example can include any of the above and/or below examples where the coated textile defines the first surface.

Another example can include any of the above and/or below examples where another textile defines the second surface.

Another example can include any of the above and/or below examples where the another textile is coated with another solvent free coating comprising Polycarbonate, Polyethylene, Siloxane, Wax, and Fluoropolymer, without organic solvent residue.

Another example can include any of the above and/or below examples where the another solvent free coating comprises equal percentages of Polycarbonate, Polyethylene, Siloxane, Wax, and Fluoropolymer, as the solvent free coating.

Another example can include any of the above and/or below examples where the input mechanism comprises a keyboard and the coated textile is positioned as a palm or arm rest for a user of the device.

Another example can include any of the above and/or below examples where the input mechanism comprises a touch-sensitive display and the coated textile is positioned on a backside of the touch-sensitive display.

Another example can include any of the above and/or below examples where a single textile covers at least portions of both the first and second surfaces, and wherein the single textile is coated to form the coated textile on both the first and second surfaces or wherein the single textile is coated to form the coated textile on one of the first and second surfaces and the other of the first and second surfaces is uncoated or comprises a different coating.

Another example includes a film for application to a textile, the film having a composition comprising Polycarbonate 40-52%, Polyethylene 37-49%, Siloxane 0-6%, Wax 0-6%, and Fluoropolymer 0-9%.

Another example can include any of the above and/or below examples where the film does not include any organic solvent.

Another example can include any of the above and/or below examples where the film further comprises an adhesive sheet.

Another example can include any of the above and/or below examples where the adhesive sheet comprises a hotmelt sheet.

Another example can include any of the above and/or below examples where the adhesive sheet is less than 50 microns and wherein the hotmelt sheet is less than 80 microns.

Another example can include any of the above and/or below examples where the film is less than 50 microns.

Another example can include any of the above and/or below examples where the film is transparent.

Another example can include any of the above and/or below examples where the film further includes a dye.

Another example includes an assembly comprising a textile and a solvent free film positioned over at least a portion of the textile, the solvent free film comprising Polycarbonate, Polyethylene, Siloxane, Wax, and Fluoropolymer without organic solvent.

Another example can include any of the above and/or below examples where the textile is less than 500 microns thick and the solvent free film is less than 50 microns thick.

CONCLUSION

Although techniques, methods, devices, systems, etc., pertaining to solvent free coatings and films are described in language specific to structural features and/or methodological acts, it is to be understood that the subject matter defined in the appended claims is not necessarily limited to the specific features or acts described. Rather, the specific features and acts are disclosed as example forms of implementing the claimed methods, devices, systems, etc.

The invention claimed is:

1. A device, comprising:
   first and second spaced apart surfaces that define a constrained thickness of the device; and,
   an input mechanism positioned relative to the first and second surfaces, and wherein at least one of the first and second surfaces is defined at least in part by a coated textile that is bound by a pressure sensitive adhesive to a solvent free film comprising a blend consisting of Polycarbonate, Polyethylene, Siloxane, Wax, and Fluoropolymer and that is essentially free from organic solvent residue.

2. The device of claim 1, wherein the solvent free film is free from organic solvent residue.

3. The device of claim 2, wherein the coated textile is less than 1 millimeter thick, or wherein the solvent free film is less than 50 microns thick.

4. The device of claim 1, wherein the coated textile defines the first surface.

5. The device of claim 4, wherein a second textile defines the second surface.

6. The device of claim 5, wherein the second textile is coated with a second solvent free coating comprising Polycarbonate, Polyethylene, Siloxane, Wax, and Fluoropolymer, without organic solvent residue.

7. The device of claim 6, wherein the second solvent free coating comprises equal percentages of Polycarbonate, Polyethylene, Siloxane, Wax, and Fluoropolymer, as the solvent free coating.

8. The device of claim 1, wherein the input mechanism comprises a keyboard and the coated textile is positioned as a palm or arm rest for a user of the device.

9. The device of claim 1, wherein the input mechanism comprises a touch-sensitive display and the coated textile is positioned on a backside of the touch-sensitive display.

10. The device of claim 1, wherein a single textile covers at least portions of both the first and second surfaces, and wherein the single textile is coated to form the coated textile on both the first and second surfaces or wherein the single textile is coated to form the coated textile on one of the first and second surfaces and the other of the first and second surfaces is uncoated or comprises a different coating.

11. A keyboard, comprising:
    first and second spaced apart surfaces that define a constrained thickness;
    an input mechanism positioned on the first surface, a remainder of the first surface defined at least in part by a coated textile that includes a first solvent free coating comprising a first blend consisting essentially of Polycarbonate, Polyethylene, Siloxane, Wax, and Fluoropolymer; and
    a second textile positioned on the second surface and comprising a second solvent free coating comprising a second blend consisting essentially of Polycarbonate, Polyethylene, Siloxane, Wax, and Fluoropolymer at equal percentages to the first blend.

12. The keyboard of claim 11, wherein the first solvent free coating further comprises an antimicrobial compound.

13. The keyboard of claim 12, wherein the antimicrobial compound comprises Silver, Copper, or Zinc.

14. The keyboard of claim 11, wherein the first solvent free coating further comprises an essential oil.

15. A device, comprising:
    a first surface that is covered in part by a coated textile; and,
    an input mechanism positioned on the first surface, the coated textile includes a pressure sensitive adhesive secured to a solvent free film comprising a blend consisting essentially of Polycarbonate, Polyethylene, Siloxane, Wax, and Fluoropolymer and that is essentially free from organic solvent residue.

16. The device of claim 15, further comprising a second surface that opposes the first surface, and wherein at least a portion of the second surface is also defined by the coated textile.

* * * * *